United States Patent [19]
Yamamoto et al.

[11] Patent Number: 5,774,105
[45] Date of Patent: Jun. 30, 1998

[54] DISPLAY APPARATUS WITH MEMORY CHARACTERISTIC FOR STORING SYSTEM DATA

[75] Inventors: Takashi Yamamoto, Yamato; Tomoyuki Ohno, Atsugi, both of Japan

[73] Assignee: Canon Kabushiki Kaisha, Tokyo, Japan

[21] Appl. No.: 540,137

[22] Filed: Oct. 6, 1995

[30] Foreign Application Priority Data

Oct. 7, 1994 [JP] Japan ................................. 6-270642

[51] Int. Cl.⁶ ............................................ G09G 3/36
[52] U.S. Cl. .......................... 345/97; 345/1; 345/103; 345/117
[58] Field of Search ................... 345/4, 5, 87, 97, 345/117, 85, 108–111, 1, 103; 399/81; 364/237.2–237.4, 273.4, 927.2–927.7, 948.5

[56] References Cited

U.S. PATENT DOCUMENTS

| | | | |
|---|---|---|---|
| 4,179,732 | 12/1979 | Khan et al. | 364/273.4 |
| 4,371,870 | 2/1983 | Biferno | 345/87 |
| 4,454,592 | 6/1984 | Cason et al. | 364/927.2 |
| 4,611,289 | 9/1986 | Coppola | 364/273.4 |
| 5,155,513 | 10/1992 | Matsumura et al. | 354/106 |
| 5,280,277 | 1/1994 | Hornbeck | 345/108 |
| 5,384,633 | 1/1995 | Boyd | 399/81 |
| 5,627,569 | 5/1997 | Matsuzaki et al. | 345/97 |

FOREIGN PATENT DOCUMENTS 6-147929  5/1994  Japan .

*Primary Examiner*—Jeffery Brier
*Attorney, Agent, or Firm*—Fitzpatrick, Cella, Harper & Scinto

[57] ABSTRACT

A display apparatus is constituted by at least one display panel, such as a liquid crystal panel, so as to include a first display region and a second display region. At least one of the first and second display regions is provided with a memory characteristic so as to avoid the use of a special memorization means, such as a non-volatile memory or a temporary power supply. The first display region is used to effect an ordinary display, and the second display region is used to display system data. As a result, loss of data at the time of power supply interruption is prevented inexpensively, so as to recognize both stored display data and system data, such as error data and start up state data.

43 Claims, 11 Drawing Sheets

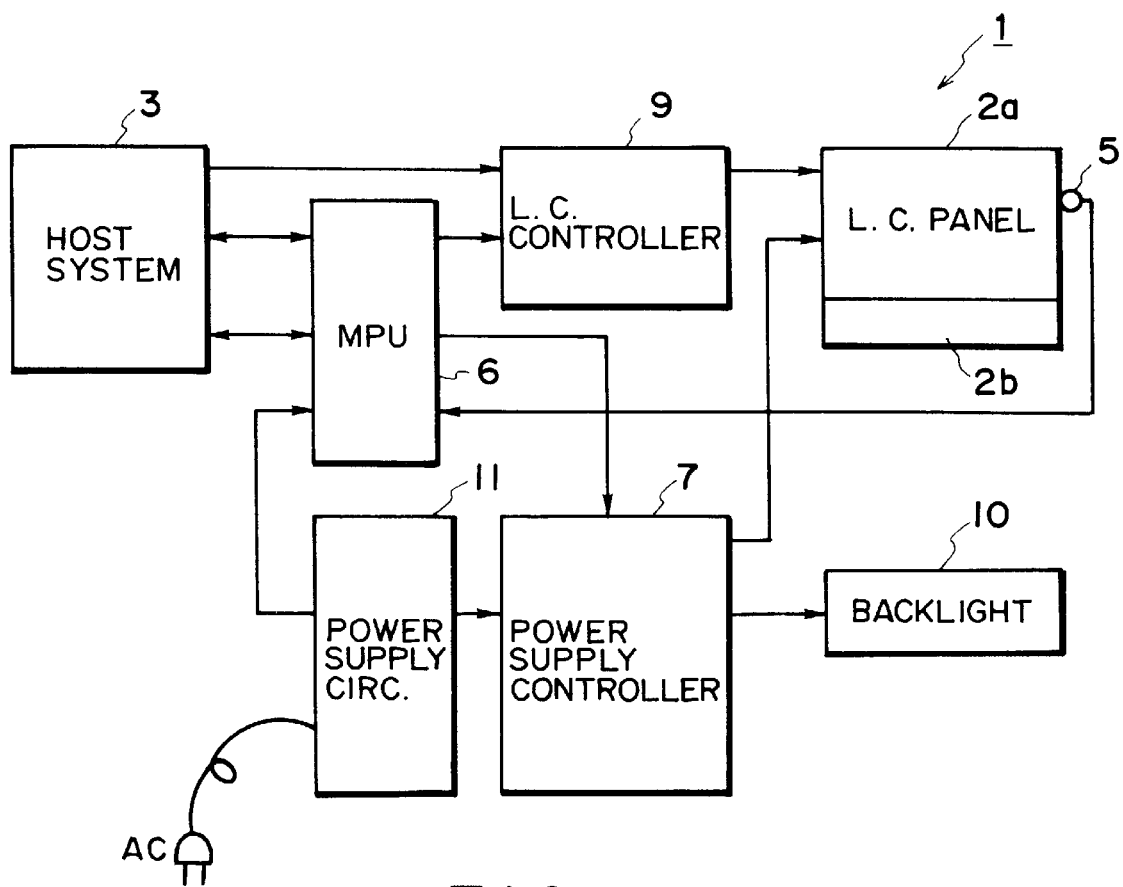
F I G. 1
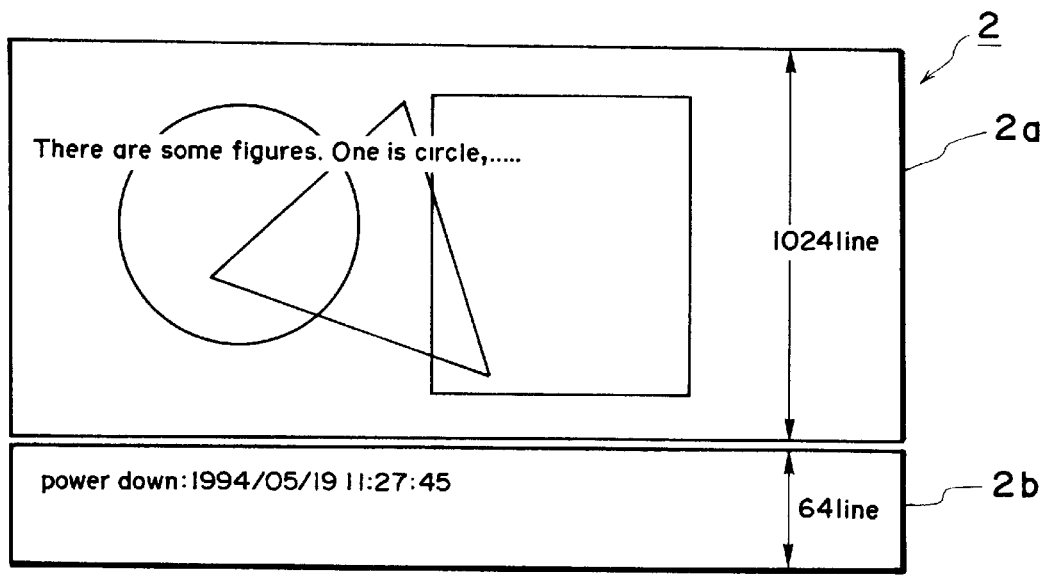
F I G. 2

DISPLAY APPARATUS WITH MEMORY CHARACTERISTIC FOR STORING SYSTEM DATA

FIELD OF THE INVENTION AND RELATED ART

The present invention relates to a display apparatus used for a television receiver, a view finder for a video camera, a light valve for a video projector, etc., particularly a display apparatus designed for storing system data by utilizing a memory characteristic incorporated therein.

Various display apparatus for data display have been proposed heretofore.

Among these display apparatus, there are some apparatus designed to display various comments or statements regarding the starting-up state of the apparatus at the time of starting-up or turning-on of the apparatus for facilitating the recognition of such state.

Further, there are some display apparatus designed to memorize display data even at the time of power failure or turning-off of the power and display stored data at the time of re-start or starting-up by incorporating a data storage means, such as a non-volatile memory or a temporary power supply.

However, in such an apparatus intended to display comments at the time of start-up without being equipped with a data storage means, the data is lost at the time of power off, and the restoration of the system is liable to be difficult or failed.

On the other hand, in an apparatus equipped with a data storage means and designed to display such stored data at the time of start-up, only stored data is displayed on a screen or display panel so that it is impossible to recognize the start-up state of the apparatus. Further, an apparatus equipped with a nonvolatile memory or a temporary power supply for data storage is liable to be expensive and cannot be applied to a personal computer or like appliances. Particularly, accompanying the development of larger screen size displays in recent years, the data to be stored is also increasing, so that such data storage means becomes further expensive. Furthermore, such data storage means is designed to reproduce the stored data by re-starting a large-scale system or a specific apparatus therefor, and is liable to consume a large amount of power or length of time until the start-up, thus being far from satisfaction.

On the other hand, from the viewpoint of secret observation of image data, there have been known display apparatus designed to continue supplying power for a certain period of time even after tuning off the power supply switch, during which the display content is erased (EP-B 256,879; U.S. Pat. No. 5,155,513).

Such a system has been developed because the display device used therein has a memory characteristic and retains displayed image even after the drive signals are ceased to be supplied to the display panel or pixels thereof. Accordingly, this type of display apparatus, like the above-mentioned apparatus, cannot solve the problem that, when a system error or hardware error occurs, the cause thereof can be unknown if the power supply is turned off.

SUMMARY OF THE INVENTION

A primary object of the present invention is to provide a display apparatus having solved the above-mentioned problems and capable of storing system data based on a simple system.

A second object of the present invention is to provide a display apparatus capable of easily restoring the system after occurrence of an error.

A third object of the present invention is to provide a display apparatus capable of recognizing system data, such as error messages, without restarting the system after occurrence of an error.

A fourth object of the present invention is to provide a display apparatus having an inexpensive system data storage means.

According to the present invention, there is provided a display apparatus, comprising: display means for providing a display based on image data including a display region having a memory characteristic and drive means for driving the display means so as to store system data in the display region by utilizing the memory characteristic of the display region. The above-mentioned means for storing system data in the display region may preferably include means for generating the system data.

According to another aspect of the present invention, there is provided a display apparatus, comprising: display means including a first display region for providing a display based on image data and a second display region for displaying system data having a memory characteristic and drive means for driving the display means so as to store the system data in the second display region by utilizing the memory characteristic of the second display region.

According to still another aspect of the present invention, there is provided a display apparatus, comprising: display means having a first display region for providing a display based on image data, and means for defining a second display region having a memory characteristic in an arbitrary region in the first display region and storing system data in the second display region by utilizing the memory characteristic of the second display region.

According to a further aspect of the present invention, there is provided a display apparatus, comprising:

a first display means comprising a liquid crystal having a memory characteristic, a host system for supplying image data to the first display means to effect a display, and a second display means comprising a liquid crystal for displaying system data inclusive of an error message, so as to store data even at a power supply interruption.

In the display apparatus, image data is supplied from the host system to the first display means where a display based on the image data is effected. On the other hand, in case where an error occurs or the power supply is interrupted, prescribed system data is displayed on the second display means. At least the first display means is constituted by a liquid crystal having a memory characteristic, the data displayed on the first display means is stored even if the power supply to the display apparatus is interrupted.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a block diagram of a liquid crystal display apparatus according to an embodiment of the invention.

FIG. 2 is an illustration of an ordinary display region, and a system data display region on a liquid crystal panel.

DESCRIPTION OF THE PREFERRED EMBODIMENTS

Figure 3:
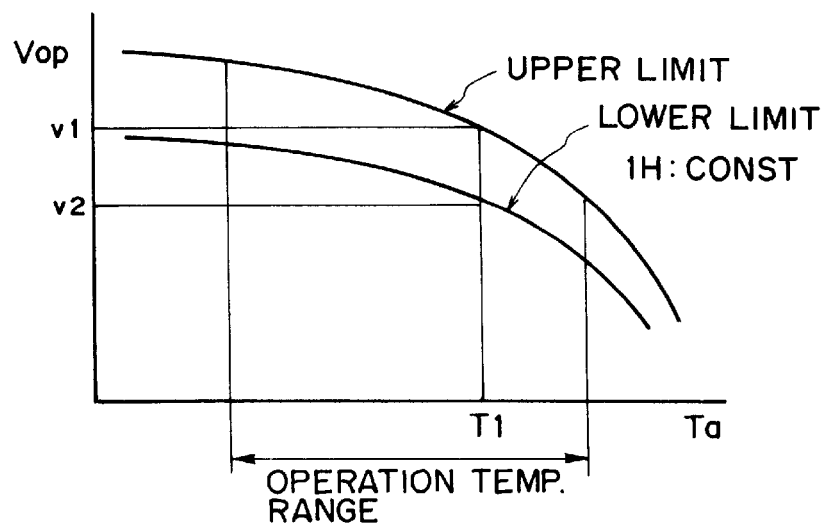
FIG. 3 is a graph for illustrating an upper limit and a lower limit of drive voltage (Vop) versus the panel temperature.

In the display apparatus according to the present invention, system data may be stored in a display device as a display means by utilizing a memory characteristic of the display device.

The system data referred to herein may include data which is required by a user or a superintendent for maintaining, superintending or using the display apparatus per se or a system utilizing the display apparatus, such as error messages regarding errors of hardware or software, start-up states of various devices, power supply turning-on time and interruption time, available memory space, temperature condition, drive conditions and communication states.

In a preferred embodiment of the present invention, it is possible to use a single display device or plural display devices. In the former system, the display device should have a memory characteristic. In the latter system, a display device for displaying system data should have a memory characteristic and another device need not have a memory characteristic.

The former system is advantageous for providing an inexpensive system, and the latter system is advantageous in case where a special display device lacking a memory characteristic is desired for image display.

Representative examples of display device having memory characteristic may include electrochromic devices, ferroelectric liquid crystal devices using chiral smectic liquid crystals and DMD devices having micro-mirrors.

Further, image display devices may include, in addition to those described above having a memory characteristic, ordinary display devices, such as CRTs, twisted nematic liquid crystal devices, electroluminescence devices, electron-emission devices, and plasma devices.

It is particularly advantageous to use a ferroelectric liquid crystal device as a display panel for displaying both image data and system data because the ferroelectric liquid crystal device can be easily formed in a large-area display panel which has a high resolution and can be driven in a partial rewrite mode by preferential selection of certain scanning lines.

The region for displaying system data may be either fixed or variable, or may be divided into plural sub-regions which can be driven under independent conditions. It is of course possible to change an areal size ratio between the image data display region and the system data display region within a total display area.

Further, by changing the drive conditions for the display device for storing system data depending on environmental conditions, such as the temperature, it is also possible to indirectly store the environmental conditions as a system data.

It is further preferred to send system data and/or data regarding a state of power supply to a host system through a unidirectional or bilateral path between the system and the display device or control means thereof.

It is preferred to effect other tasks before, after or during the storage of system data in the display device. For example, in case where the display apparatus is equipped with an illumination light source, such as a backlight, the turning-on or -off or luminance control of the light source may be performed. In case of the occurrence of events, such as a system error or a power failure, requiring the discontinuation of the apparatus use or saving of power consumption for the display apparatus, it is preferred to effect such actions as turning-off of the backlight, discontinuation of scanning for image display and/or discontinuation of operation of other devices, depending on the events having occurred, in addition to storage of system data regarding the events. In the case of discontinuing the scanning, it is preferred to hold the potentials of the scanning electrodes and data electrodes at the reference potential so as to apply a zero electric field to an active substance, such as a liquid crystal. When it is necessary to observe the stored system data, only the backlight may be turned on so as to minimize the operation of the devices.

It is preferred for a power supply control circuit in charge of a power supply to the display device to retain a quantity of power (power×time) required for storing the system data in the display device even in case of instruction for transition to a low power consumption mode, power supply switching off, an electricity failure, etc. For this purpose, it is appropriate to equip a large capacity capacitor or a reserve battery.

In the case of further communicating with the host system, it is of course necessary to have an additional reserve of accumulated power to cover the power consumption therefor.

In the present invention, it may be appropriate to use a system data generating circuit, such as a system control circuit, a system control software or program, or a detection circuit for detecting the ON or OFF state of a power supply switch.

First Embodiment

A first embodiment of the present invention will now be described with reference to FIGS. 1 to 9.

A liquid crystal display apparatus 1 according to an embodiment of the present invention is provided with two liquid crystal panels including a liquid crystal panel 2a as a first display means and a liquid crystal panel 2b as a second display means. Each of the liquid crystal panels 2a and 2b comprises a pair of oppositely disposed electrode substrates between which a ferroelectric liquid crystal is disposed (not shown). The ferroelectric liquid crystal has a property of maintaining its display state (orientation state) formed under application of an electric field even after the removal of the electric field and until it is supplied with a reverse electric field exceeding a threshold, i.e., a memory characteristic. Further, one liquid crystal panel 2a is designed to display an image as shown in FIG. 2, i.e., an image based on image data supplied from a host computer (host system) 3, and another liquid crystal panel 2b is designed to display a power down message as shown in FIG. 2 at the time of power supply interruption or display an error message or an occurrence of an error. Hereinafter, a term "normal display" is used to refer to image display given on the liquid crystal panel 2a depending on given image data, a term "normal display region" is used to refer to a region on the liquid crystal panel 2a in which the normal display is performed. Further, data such as, the power down message displayed, is referred to as a "system data", and a region on the second liquid crystal panel 2b displaying the system data is referred to as a "system (data) display region". Further, the system data display region 2 is designed to effect writing therein only when an MPU 6 (details of which will be described hereinafter) requires a new display and to store data by utilizing the memory characteristic of the ferroelectric liquid crystal to store the data. As a result, it becomes unnecessary to use a non-volatile memory for storing the data, a temporary power supply, or process or task for effecting the storage.

The liquid crystal panels 2a and 2b are provided with a temperature sensor 5, which is designed to detect the liquid crystal panel temperature (hereinafter called "panel temperature") and send the detected signal to the MPU (control means) 6.

Further, MPU 6 is designed to determine optimum drive conditions based on signals from the temperature sensor 5, i.e., to effect so-called temperature compensation. Hereinafter, some explanation will be added regarding the temperature compensation.

Figure 4:
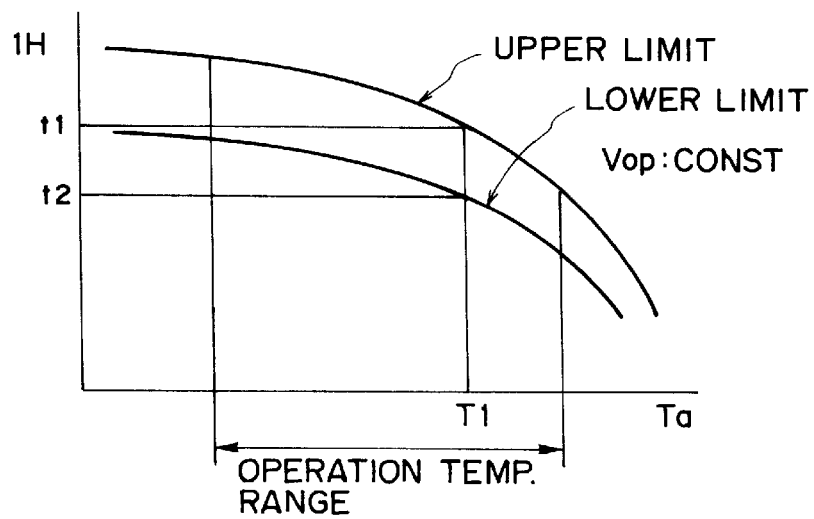
FIG. 4 is a graph for illustrating an upper limit and a lower limit of one scanning line drive time (1H) versus the panel temperature.

Proper ranges (upper limit and lower limit) of drive conditions (e.g., drive voltage Vop and one scanning line drive time 1H) of a ferroelectric liquid crystal varies depending on the panel temperature, and a proper display cannot be effected under drive conditions outside the proper ranges. FIG. 3 shows a temperature-dependence of drive voltage Vop at a constant one-scanning line drive period 1H. From this figure, it is understood that the upper limit and the lower limit of the drive condition (drive voltage Vop) changes depending on the panel temperature Ta. More specifically, in the case of the panel temperature being T1, it is shown that the liquid crystal panels 2a and 2b can effect a display if the drive voltage Vop satisfies $V2 \leq Vop \leq V1$. Further, FIG. 4 shows a temperature-dependence of drive time 1H at a constant drive voltage Vop. This figure also shows that the upper limit and the lower limit of the drive condition (drive time 1H) change depending on the panel temperature Ta. More specifically, in the case of the panel temperature being T1, it is shown that the liquid crystal panels 2a and 2b can effect a display if the drive time 1H satisfies $t2 \leq 1H \leq t1$. In this embodiment, the drive time 1H and the drive voltage Vop are determined from the relationship shown in FIGS. 3 and 4 based on the panel temperature Ta (FIG. 5), and the relationship is memorized at ROM in MPU 6. MPU 6 is designed to select optimum conditions (coded data of drive time 1H and drive voltage Vop, hereinafter called "1H code" and "Vop code", respectively) in consideration of the panel temperature based on signals from a temperature sensor 5. In other words, in this embodiment, a temperature compensation is effected by a combination of drive time 1H and drive voltage Vop.

Referring to FIG. 1, a power supply controller 7 is connected to MPU 6, so that the above-mentioned Vop code is sent from MPU 6 to the power supply controller 7. The power supply controller 7 is designed to supply optimum liquid crystal drive voltages depending on the Vop code to drive ICs (not shown) for the liquid crystal panels 2a and 2b.

MPU 6 is connected to a host computer 3 and requests image data from the host computer 3 at a time selected according to the 1H code so as to control the transfer of the image data. Further, a liquid crystal controller 9 is disposed between the host computer 3 and the liquid crystal panel 2a, so that image data from the host computer 3 is converted into a desired data form at the liquid crystal controller 9 and then sent to the drive IC of the liquid crystal panel 2a, thereby effecting a normal display in a normal display region on the liquid crystal panel 2a. Further, the host computer 3 supplies a control signal to MPU 6 for controlling the transfer of image data.

Further, a serial communication is performed between MPU 6 and the host computer 3 so that display modes for the liquid crystal panels 2a and 2b designated by the host computer 3 are transferred to MPU 6, and data regarding the drive conditions and internal states of the liquid crystal panels 2a and 2b are transferred to the host computer 3.

Behind and opposite to the liquid crystal panels 2a and 2b, a backlight device 10 is disposed so as to illuminate the liquid crystal panels 2a and 2b. The backlight device 10 is connected to the power supply controller 7 so as to be supplied with a drive voltage.

Further, the above-mentioned liquid crystal display apparatus 1 is equipped with an operation display LED (not shown) which is designed to be continuously turned on while the display apparatus 1 is in operation and turned off when an error occurs. (Details will be described later.) Further, the liquid crystal display apparatus 1 is equipped with a switching power supply (power supply circuit) so as to turn on and off an AC power supply.

The operation of the first embodiment will be described with respect to those at the time of liquid crystal display device power supply interruption, restarting, and occurrence of an error, respectively.

<Drive>

When the switching power supply 11 is turned on, the backlight device 10 is turned on and the liquid crystal panels 2a and 2b are placed in an operable state. Then, when a keyboard (not shown) connected to the host computer 3 is manipulated, prescribed image data is sent via the liquid crystal controller 9 to the liquid crystal panel 2a on which an image is displayed based on the data.

Figure 5:
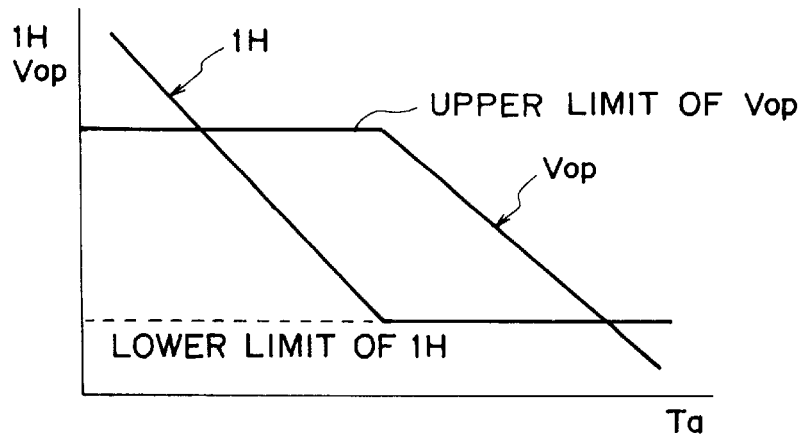
FIG. 5 is a graph for illustrating a drive voltage Vop and a one scanning line drive time 1H stored in MPU.

At this time, the panel temperature is detected by the temperature sensor 5, and MPU 6 determines optimum Vop code and 1H code based on a signal from the sensor 5 (see FIG. 5). Vop code is sent from MPU 6 to the power supply controller 7, which supplies liquid crystal drive voltages to the driver ICs of the liquid crystal panels 2a and 2b based on the code. On the other hand, MPU 6 requests image data to the host computer 3 at a selected time based on the 1H code. As a result, the host computer 3 outputs image data to the liquid crystal controller 9, which transfers the image data to the driver IC of the liquid crystal panel 2a according to the command of MPU 6. Thus, the driver IC supplied with the liquid crystal drive voltage and image data displays a desired pattern on the liquid crystal panel 2a (see FIG. 2). During the operation of the liquid crystal display apparatus 1 in the above-described manner, the operation display LED is continuously turned on.

<Power supply interruption>

Figure 6:
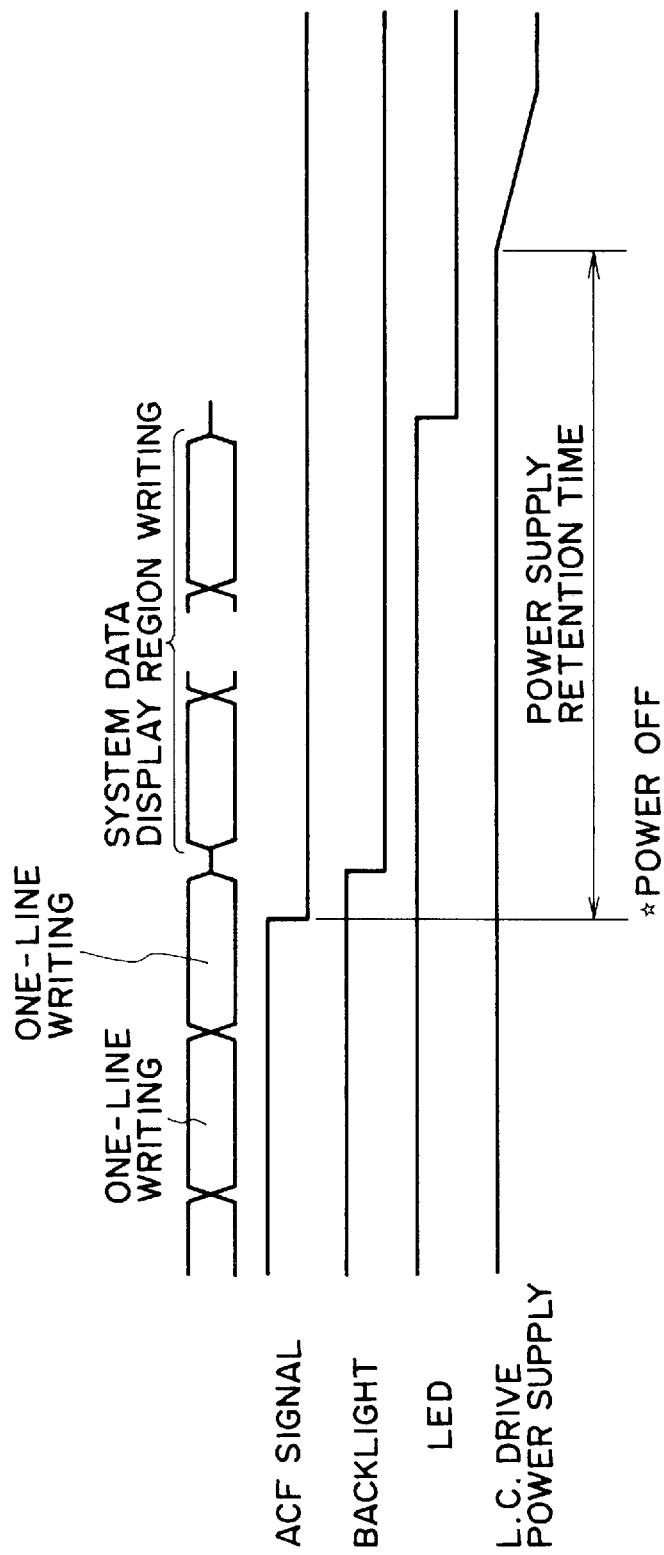
FIG. 6 is a power supply interruption sequence of a liquid crystal display apparatus.

Now, if the switching power supply is turned off to interrupt the AC power supply, as shown in FIG. 6, an ACF signal is sent from the switching power supply 11 to MPU 6, and MPU 6 having received the ACF signal displays a power down message and the end time in the system data display region and turns off the backlight device 10 via the power supply controller 7 after completion of one scanning line drive. Then, MPU 6 commands the liquid crystal controller 9 and the power supply controller 7 to effect a termination operation. On the other hand, the power supply controller 7 continues to supply liquid crystal drive voltages to the liquid crystal panels 2a and 2b for a prescribed period (power supply retention time) and cuts off the liquid crystal drive voltages after the lapse of the time. At this time, the content (power down message) displayed in the system data display region is continued to be retained due to the memory characteristic of the ferroelectric liquid crystal.

<Re-start>

Figure 7:
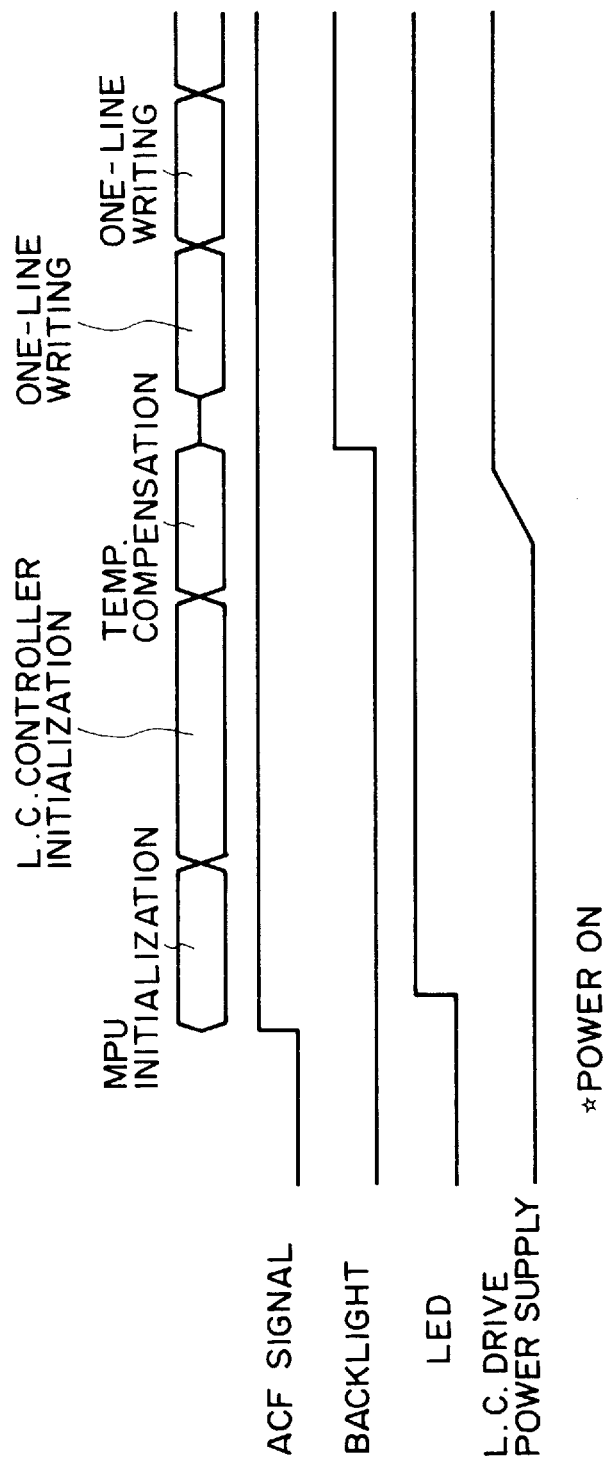
FIG. 7 is an illustration of a re-startup sequence of a liquid crystal display apparatus.

When the switching power supply 11 is turned on, as shown in FIG. 7, MPU 6 effects the initial setting of MPU 6 per se and the initial setting of the liquid crystal controller 9. Then, MPU 6 effects a temperature compensation based on a signal from the temperature sensor 5 and drives the power supply controller 7 to turn on the backlight device 10. By turning-on of the backlight device 10, the liquid crystal panels 2a and 2b are placed in a state where the display contents thereon are recognizable. As the ferroelectric liquid crystal has a memory characteristic, accompanying the turning-on of the backlight device 10, the data before cutting-off of the power supply is re-displayed. More specifically, as the power down message and the end time are displayed in the system data display region at the time of the power supply interruption, these displays are made recognizable as a result of the turning-on of the backlight device 10.

Then, MPU 6 performs a self-diagnosis and, if no abnormality is found as a result of the diagnosis, MPU 6 requests image data to the host computer 3. Complying with the request, a normal display operation is started. Thus, an operator can confirm no abnormality by the power down message and manipulates the keyboard to start a normal display.

<Occurrence of error>

Figure 8:
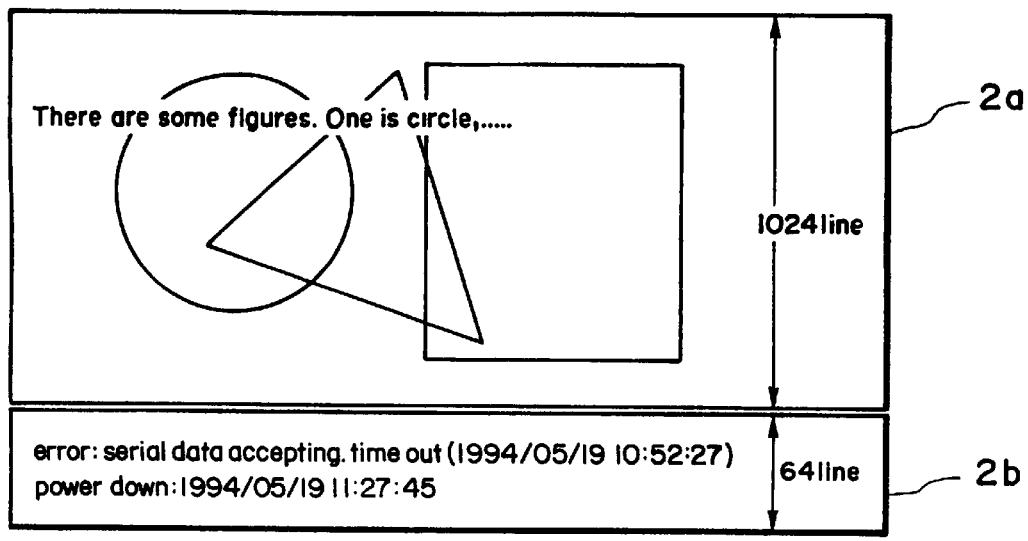
FIG. 8 is a schematic illustration of a liquid crystal panel showing error messages.
Figure 9:
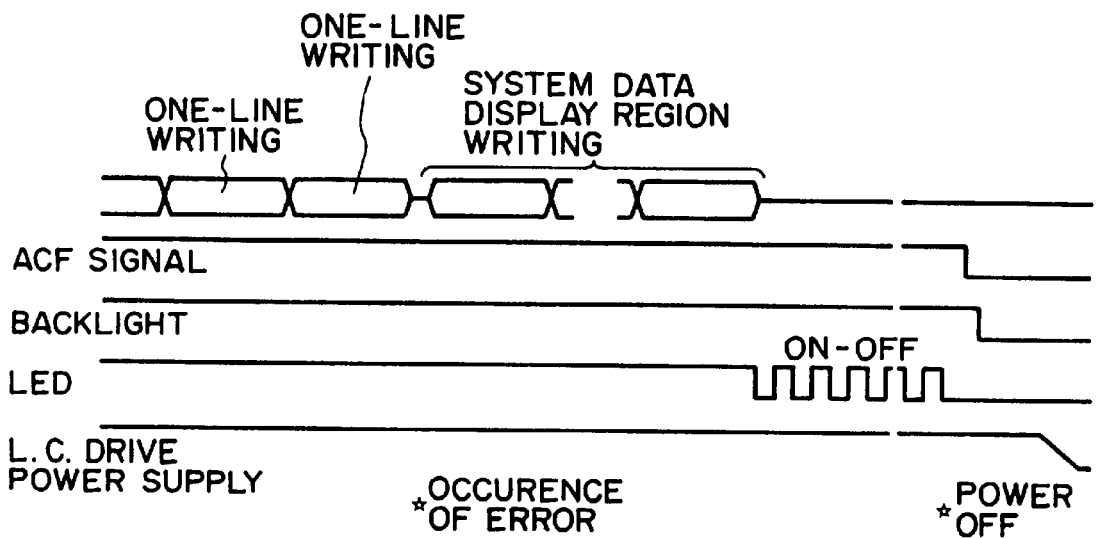
FIG. 9 is an illustration of an error occurrence sequence of a liquid crystal display apparatus.

The above-mentioned request for image data from MPU 6 to the host computer 3 is repeated for a prescribed number of times but, when no image data is issued from the host computer 3 even after lapse of a prescribed time, the request for the image data is stopped. Thus, when MPU 6 detects an error, an error message as shown in FIG. 8 is written in the liquid crystal panel 2b (system data display region). Another liquid crystal 2a (normal display region) retains a state just before the occurrence of the error and the backlight device 10 also retains the ON state as shown in FIG. 9. Further, when an error has occurred as described above, an operation indicator LED is turned on and off so that the operator can easily notice the occurrence of an error even without referring to the data in the system data display region. Thus, according to the turning-on-and-off of the operation indicator LED and the display in the system data display region, the operator can acquire data regarding the occurrence and cause of the error and take an early and appropriate action. After the repetitive flashing of the operation indicator LED, the backlight device 10 is turned off, and the liquid crystal drive power supply is also turned off to terminate the operation of the liquid crystal display apparatus 1.

The first embodiment has the following effects.

As a liquid crystal having a memory characteristic is used, data storage becomes possible and data regarding the state before a power supply interruption can be recognized again by an operator at the time of re-startup, and actions thereafter can be smoothly taken. Particularly, even in case where the power supply is inadvertently cut off, the data is not lost. This is advantageous. Further, as the data storage is performed by utilizing the memory characteristic and no special means (such as non-volatile memory or a temporary power supply), the price increase of the apparatus can be suppressed, and the application thereof to a personal appliance is also easy.

Further, in this embodiment, as a result of use of two display regions (normal display region and system data display region) in addition to the data storage, various effects can be accomplished. For example, at the time of re-startup, the data before the power supply interruption is displayed in the normal display region to accomplish the above-mentioned effect, and the startup state may be displayed successively so that the operator can easily recognize the startup state. Further, in the case of occurrence of an error, for example, ordinary data before the error is stored in the normal display region so as to allow an easy processing after the restoration, and an error message is displayed in the system data display region, so that the operator can take an appropriate action at an early stage and the restoration of the apparatus becomes easy. It is possible that an error occurs to cause a power supply interruption while an operator is away from its seat, the operator can recognize the cause of the error from the error message by switching for re-startup.

In the above-mentioned first embodiment, it is possible to rewrite the entirety of the normal display region with image data from the host computer, but it is also possible to rewrite a portion of the normal display region requiring such rewriting and retain the display in the other portion by utilizing the memory characteristic of the ferroelectric liquid crystal.

Figure 10:
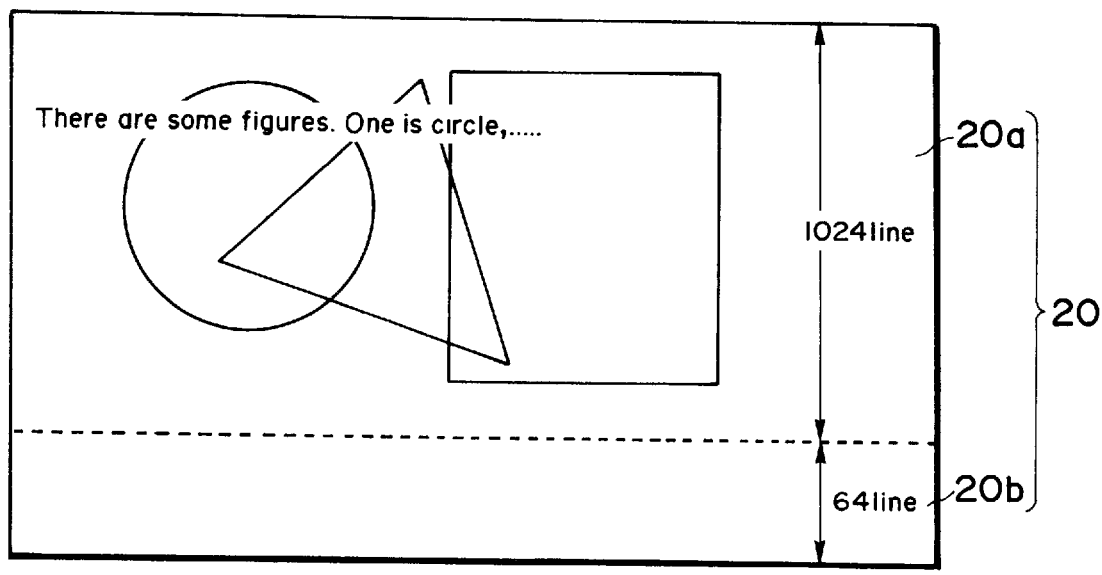
FIG. 10 is an illustration of a single panel effecting ordinary display and system data display.

In the first embodiment described above, two liquid crystal panels including a liquid crystal panel 2a as a second display means and a liquid crystal panel 2b as a second display means are separately used, but this is of course not necessary, and a single liquid crystal panel 20 as shown in FIG. 10 can also be used. More specifically, the liquid crystal panel 20 may be constituted by using a ferroelectric liquid crystal having a memory characteristic, and a prescribed region (normal display region) 20a thereof is used as a first display means for effecting a normal display in the region, and another region (system data display region) 20b is used as a second display means for displaying system data. In case where no system data display is required, the system data display region 20b may be placed in a non-display state by manipulation of a changeover switch or according to a demand from the host computer 3, so that only the normal display region 20a is used to effect a display based on image data from the host computer 3. Further, in case of no system data display, it is also possible to change the areal size ratio between the regions 20a and 20b so as to use the entire display panel 20 as a normal display region for effecting a normal display on its entirety, e.g., by manipulation of a changeover switch. Further, it is also possible to re-display a once lost system data display by a switching operation or according to a command from the host computer 3.

In the case of effecting both a normal display and a system data display on a single liquid crystal panel as described above, the areal size ratio between the two regions 20a and 20b can be varied even when the system data display is performed, e.g., by enlarging the system data display region 20b so as to allow an easy recognition of the system data display.

Now, a second embodiment of the present invention will be described with reference to FIGS. 11 and 12.

In this embodiment, a single liquid crystal panel 30 is provided with a normal display region (first display means) and a system data display region (second display means) and is so designed that the system data display region is enlarged on occurrence of an error regarding the temperature detection. The enlargement of the system data display region is not performed but a system data display is performed in the system display region of a small area in case where a normal display is performed without occurrence of an error and also in case of occurrence of an error other than one relating to temperature detection. A further description will be made below.

Figure 11:
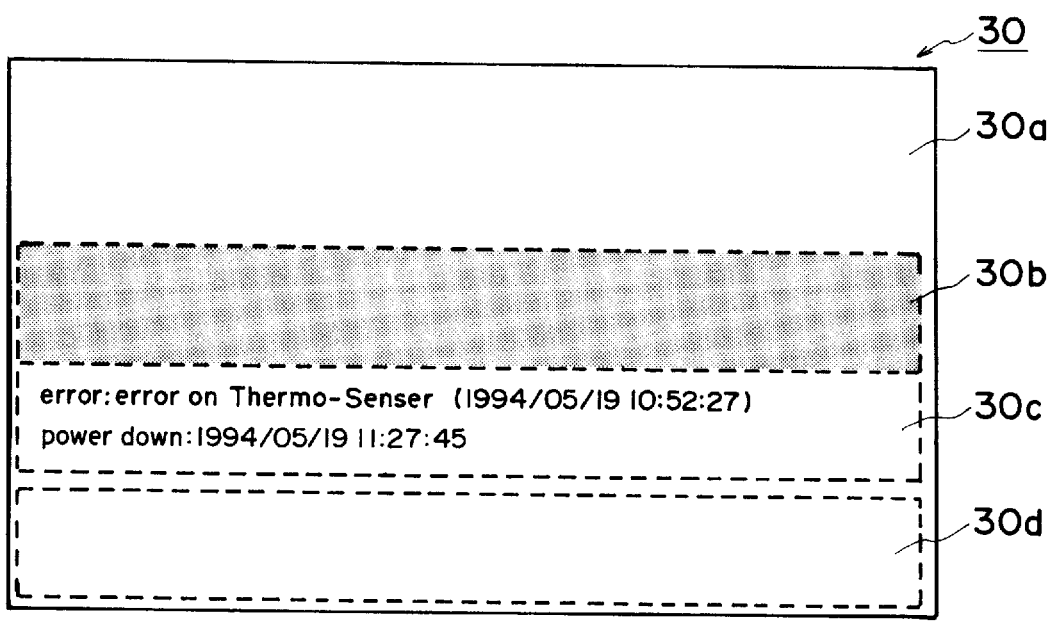
FIG. 11 is an illustration of a liquid crystal panel arrangement used in a second embodiment of the invention.

The liquid crystal panel 30 in this embodiment is used by division into 4 regions 30a, 30b, 30c and 30d as shown in FIG. 11. In case of normal display or occurrence of an error not relating to temperature detection, three regions 30a, 30b and 30c are used integrally as a normal display region and the remaining one region 30d is used as a system data display region.

When an error regarding temperature detection has occurred, the system display region is enlarged into three regions 30b, 30c and 30d, e.g., as shown in FIG. 11. In this case, however, the regions 30b, 30c and 30d are not used integrally for effecting one system data display but are used as independent regions. More specifically, the system data display regions 30b, 30c and 30d may be driven at an equal drive voltage Vop and with different one-scanning line drive times 1H, i.e., 1H=a for display region 30b, 1H=b for display region 30c and 1H=c for display region 30d. As the one-line scanning times 1H are made different, the system data display is possible unless the temperature is above c (as shown in FIG. 12). Further, the system data display regions 30b–30d are supplied with voltages so as to display three error messages of identical content. The other features for driving the liquid crystal panel 30 are similar to those described with reference to the first embodiment.

This embodiment functions as follows.

Also in this embodiment, temperature compensation is performed by the temperature sensor 5 and MPU 6 similarly as in the first embodiment. As a result, the liquid crystal panel 30 can be driven under an optimum drive condition of, e.g., one-line scanning drive time 1H, although the drive condition (upper limit and lower limit of 1H) depends on the panel temperature, thereby being able to effect a display regardless of the panel temperature.

Now, if an error relating to the temperature sensor 5 has occurred to make inoperable the function of detecting the temperature of the liquid crystal panel 30, the panel temperature becomes unknown so that the above-mentioned temperature compensation becomes impossible. In this embodiment, however, the three regions 30b–30d are driven at different conditions (drive time 1H) of 1H=a, 1H=b and 1H=c. As a result, if the panel temperature is at most C, an error message is displayed in the region 30b; if the panel temperature is between A and B, an error message is displayed in the region 30C; and if the panel temperature is between B and C, an error message is displayed in the region 30d (see FIG. 11). In other words, such an error message is displayed in any one of the regions 30b–30d as far as the panel temperature is at most C. The error messages displayed are all identical in any of the regions 30b–30d.

This embodiment has the following effects.

According to this embodiment, even in case of an error relating to temperature detection occurs, an error message relating thereto is always displayed in any one of the system data display regions 30b–30d, so that an operator can easily acquire data regarding the occurrence of a temperature detection which is liable to cause other serious errors and can take an appropriate step based on the data.

Figure 12:
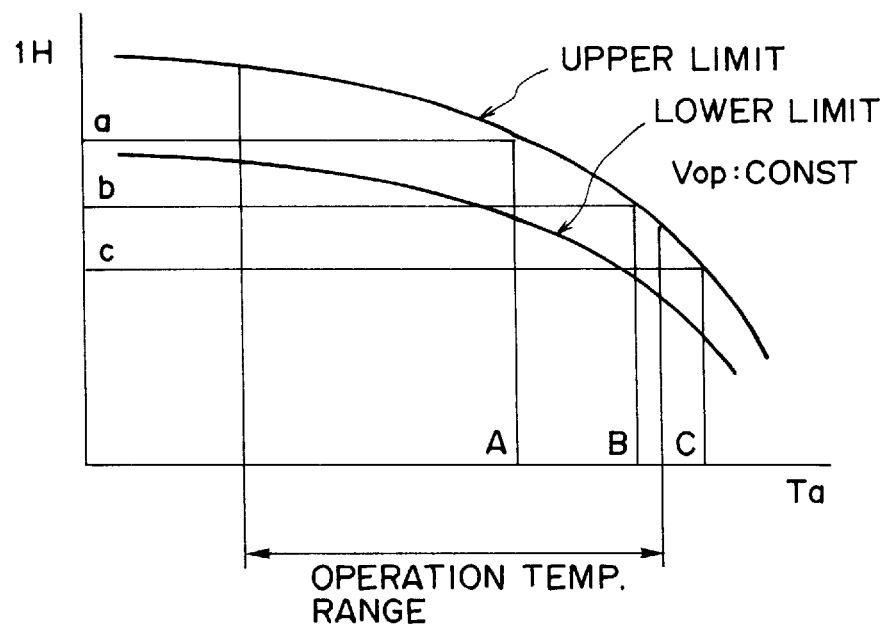
FIGS. 12 and 13 are graphs for illustrating one line drive time (1H) and drive voltage (Vop), respectively, for a liquid crystal panel in the second embodiment.

Incidentally, in case where the liquid crystal panel 30 is driven in a matrix drive mode, when a drive is performed at 1H exceeding the upper limit shown in FIG. 12, pixels on scanning lines other than a selected scanning line are also affected by data signals for pixels on the selected scanning line to cause crosstalk. Accordingly, even if pixels in a certain portion are written under optimum conditions, the resultant display state at such pixels can be lost if another portion is written at a condition (1H) exceeding the upper limit for the certain portion. On the other hand, under a drive condition (1H) below a lower limit, such influence from writing on other scanning lines is little, and the display state of an already written portion can be retained. For such a reason, the display state is not lost without the influence of crosstalk, if the writing is performed in an order of from a portion of a larger drive condition (1H) to a portion of a smaller drive condition (1H).

Figure 13:
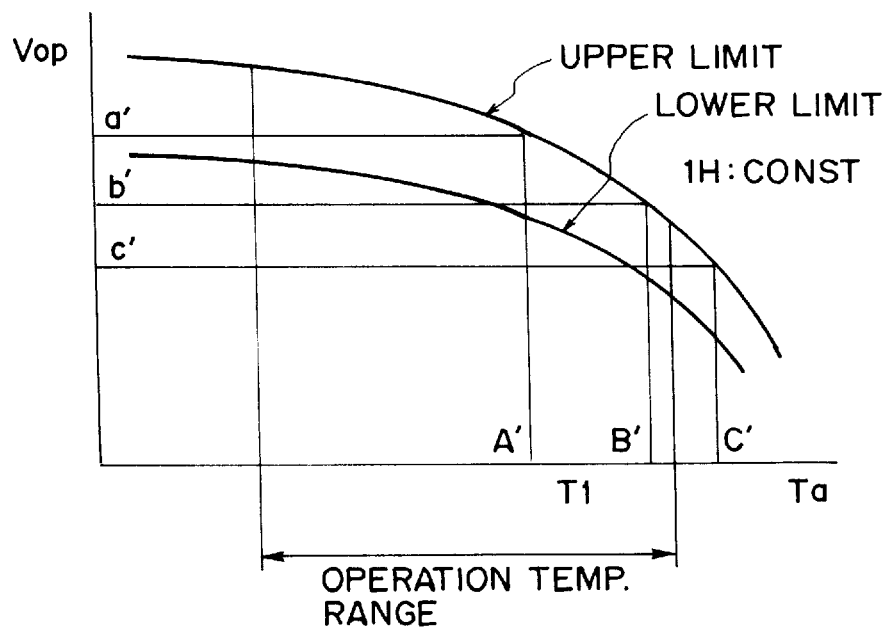

The above description of this embodiment based on FIG. 12 has been made by taking 1H as a drive condition, but this is not essential. For example, a similar operation may be made also when a drive voltage Vop is varied at a constant 1H. More specifically, the liquid crystal panel 30 may be provided with three system data display regions 30b–30d as shown in FIG. 11, which are driven under drive voltages Vop of a', b' and c', respectively. When the panel is driven at Vop=a' as shown in FIG. 13, a display is possible at a temperature of at most A'; similarly at Vop=b', drive is possible at a temperature between A' and B'; and at Vop=C', drive is possible at a temperature between B' and C'. As a result, even in case of an error relating to the temperature sensor 5, an error message is shown in any one of the display regions 30b–30d, provided that the panel temperature is at most C'. Also in this case, it is preferred to write in an order of from a region of a large drive voltage Vop to a region of a smaller drive voltage Vop so as to avoid an adverse influence of crosstalk.

In the above-mentioned second embodiment, a liquid crystal panel 30 is provided with plural system data display regions of 30b–30d having different drive conditions, but this is not limitative. For example, a single system data display region may be provided do as to be driven sequentially under different conditions which may be selected by switch manipulation or automatically. As a result, even if an error occurs such that the panel temperature becomes unknown, an error message display can be effected under a properly selected drive condition, so that the operator can take an appropriate step based on the display.

Figure 14:
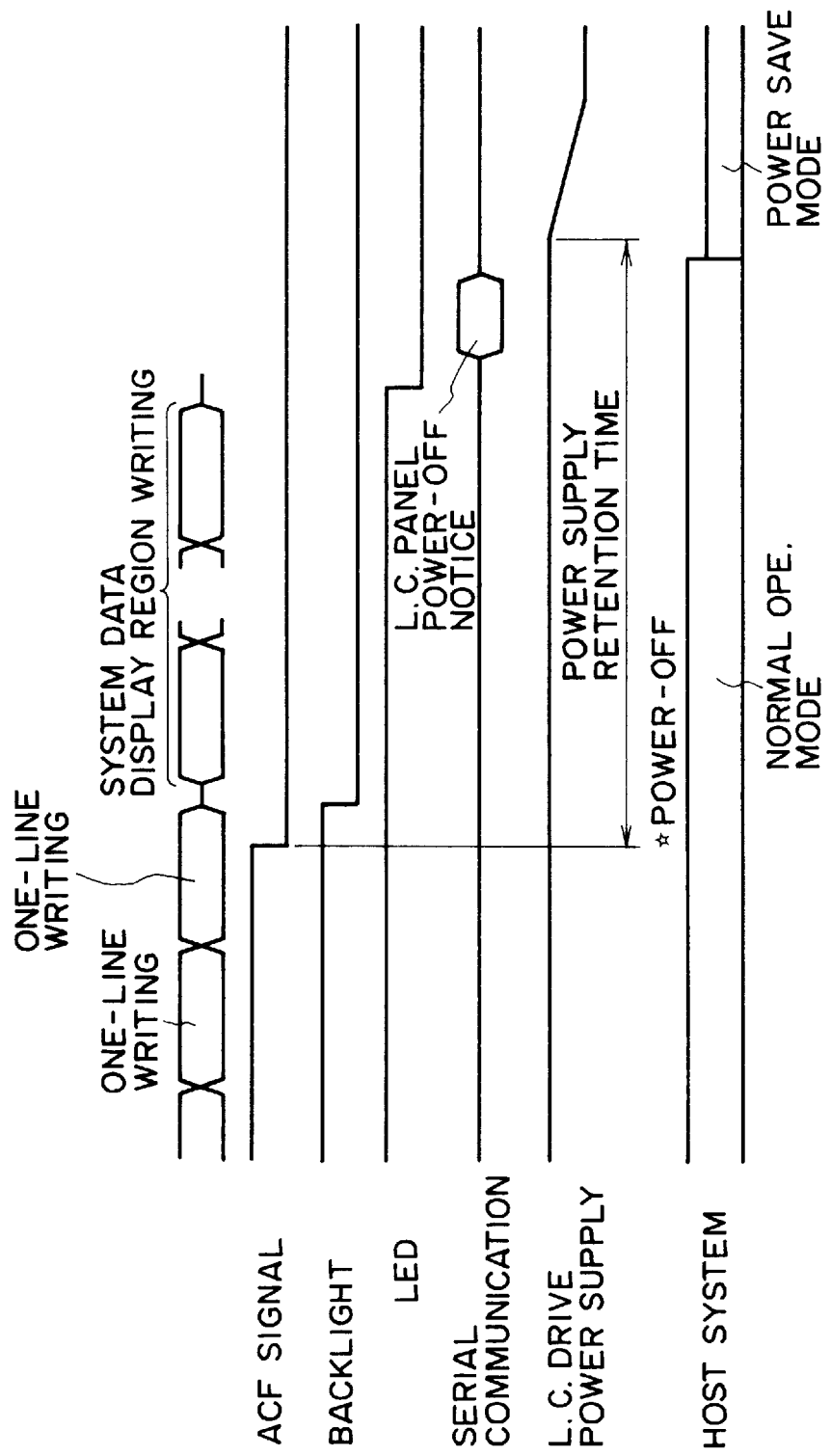
FIG. 14 is an illustration of another power supply interruption sequence.

Another embodiment concerning power supply interruption is illustrated in FIG. 14.

In the embodiment shown in FIG. 14, a termination operation sequence is designed to include a notice of a power supply interruption of the liquid crystal display apparatus 1 to the host computer 3 via serial communication (bilateral communication path). This point is different from the first embodiment. The host computer 3 is designed to transfer to a power save mode on receiving the power off notice. In this instance, the host computer 3 can also be designed to ignore the notice in case where some operation should be continued regardless of the power on or off of the display region 1.

Figure 15:
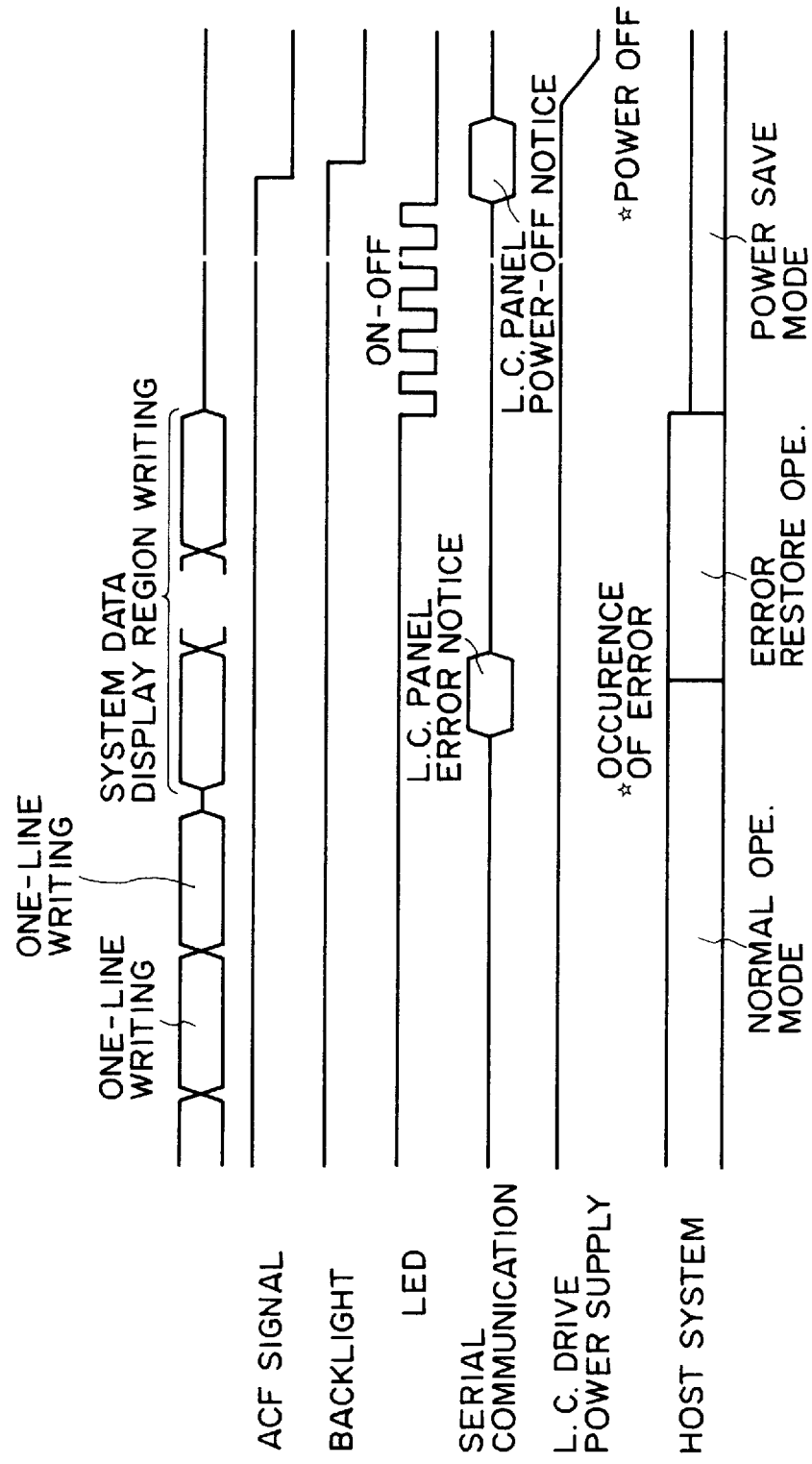
FIG. 15 is an illustration of another error occurrence sequence.

Another embodiment regarding a sequence on occurrence of an error is illustrated in FIG. 15.

In this embodiment shown in FIG. 15, when an error has occurred in the liquid crystal display apparatus 1, a sequence is designed to include a notice regarding the occurrence and the content of the error is given to the host computer 3 according to a preliminary determined code via serial communication (bilateral communication path). This point is different from the first embodiment. For example, when some trouble has occurred to make a normal display impossible in the liquid crystal display apparatus 1, an error indication is displayed on the liquid crystal panel. Simultaneously the error content is notified via the code to the host computer 3, and the host computer 3 effects a possible operation for recovery from the error. After completion of the recovery, serial communication is made from the host computer regarding the recovery from error, and the liquid crystal display apparatus 1 continues to effect an ordinary operation. In contrast thereto, in case of an unrecoverable error, the host computer 3 transfers to a power save mode after performing necessary actions for storing the states, etc. Also in this instance, the host computer 3 can be designed to ignore the error notice in case where some operation should be continued regardless of the display apparatus state.

Figure 16:
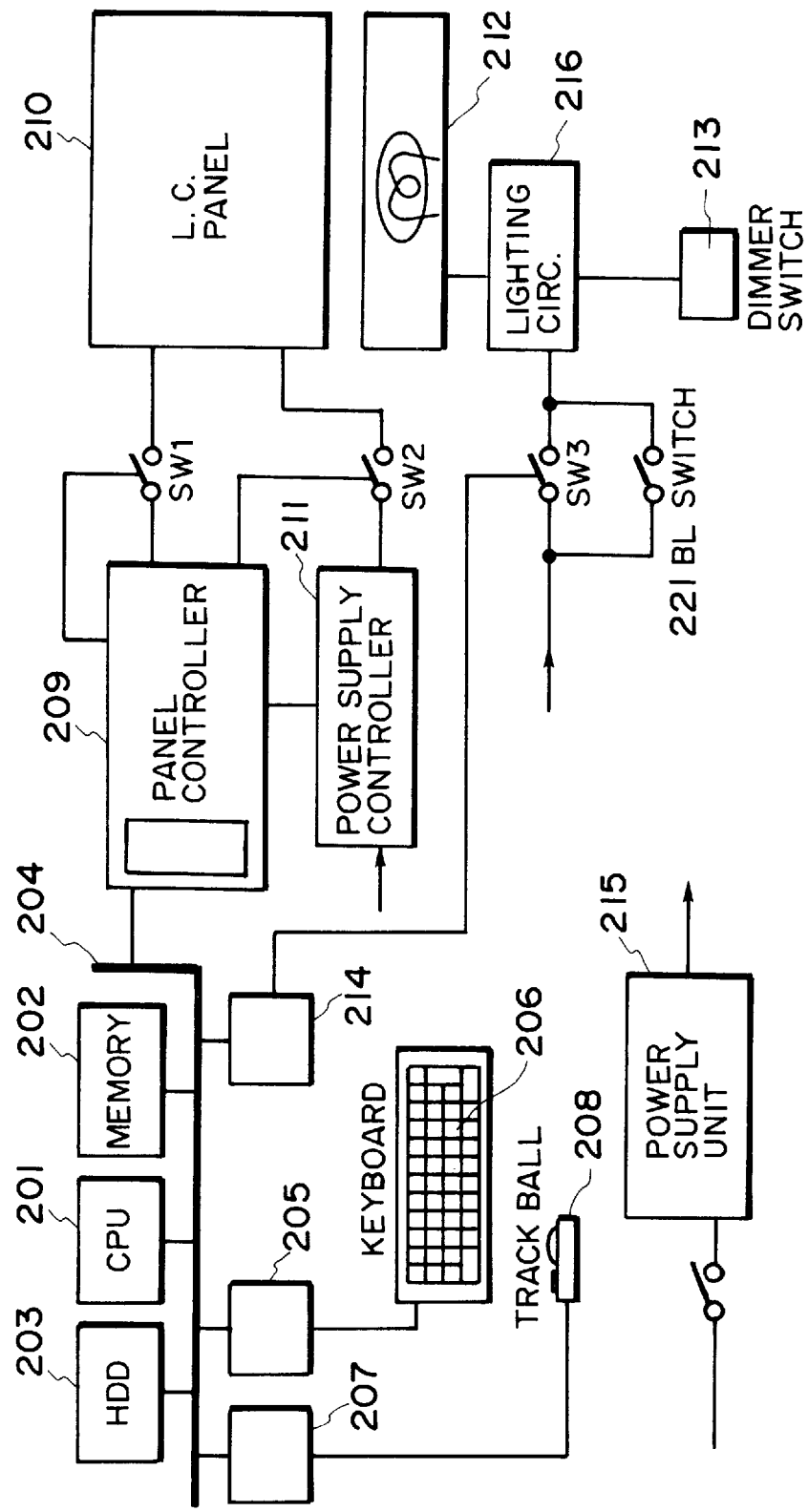
FIG. 16 is a control block diagram of a display apparatus according to another embodiment of the invention.
Figure 17:
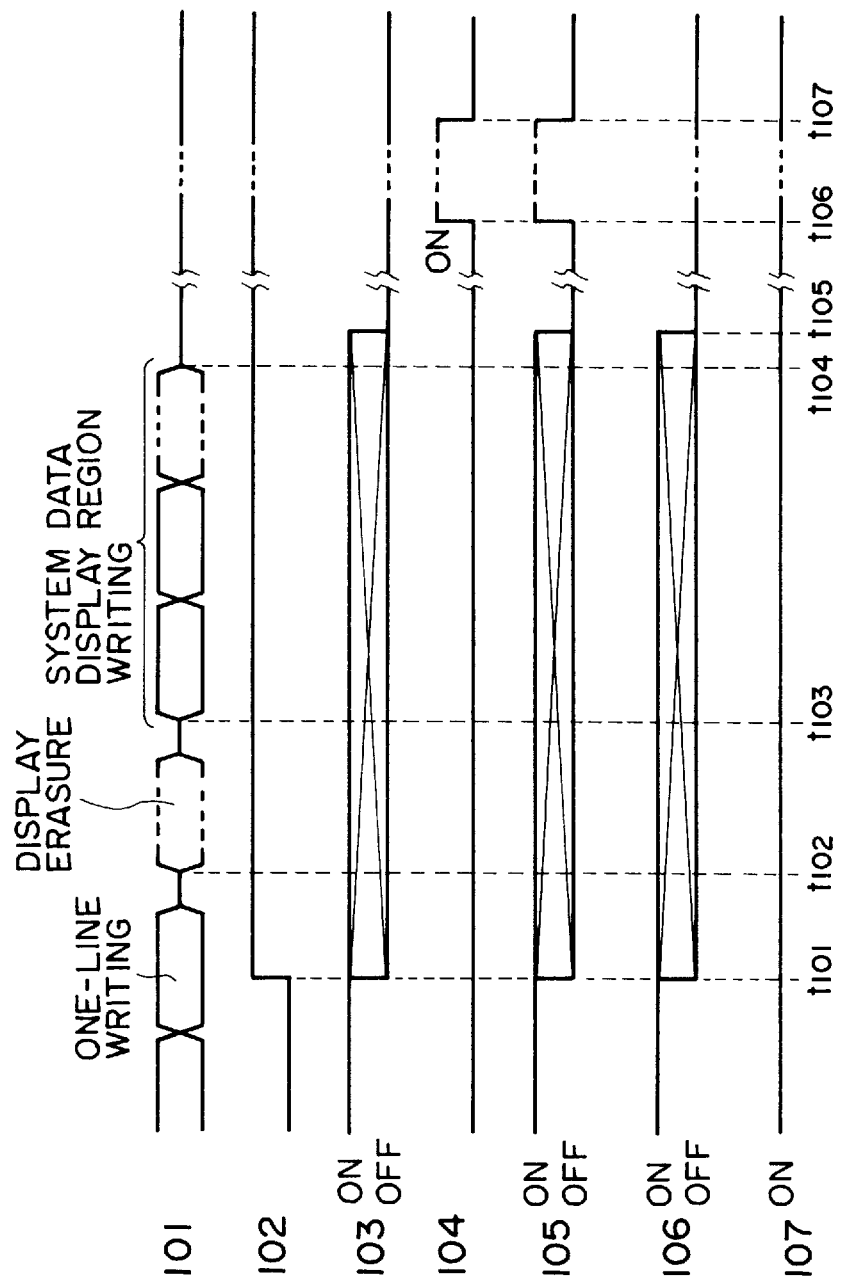
FIG. 17 is a time chart illustrating a drive sequence for the display apparatus of FIG. 16.

FIG. 16 is a block diagram of a display apparatus according to another embodiment of the present invention, and FIG. 17 is a time chart illustrating a drive sequence for the apparatus of FIG. 16.

The display apparatus includes a display panel having a memory characteristic and capable of effecting a divisional display by division into an image display region and a system data display region.

A host computer includes a CPU 201, a memory 202, and a hard disk driver 203, and is also equipped with a keyboard driver 205 and a track ball driver 207 on local buses connected to a main bus 204. The drivers 205 and 207 are connected to a keyboard 206 and a track ball 208. To local buses of the host computer are further connected a panel controller 209 for a liquid crystal panel 201 and a backlight driver 214 for lighting control of a backlight 212.

The display apparatus further includes a power supply unit 215 which supplies a DC voltage to a switch SW3 and a BL switch 221 and also to a power supply controller 211.

Image data supplemented with scanning line address data is supplied from the panel controller 209 to drivers of the panel 210. Multi-level reference DC voltages for driving the panel 210 are supplied from the power supply controller 211 via a switch SW2 to the drivers of the panel 210.

A power supply voltage for energizing the backlight 212 is supplied from the unit 215 to a lighting circuit 216 connected to a dimmer switch 213.

The operation of the display apparatus will now be described with reference to FIG. 17.

As shown at 101, image data is supplied to the panel 210 so as to write in the panel by line-by-line scanning while the backlight 212 is turned on as shown at 105.

At time t101, a command 102 is generated so as to switch the operation mode into a power save mode. Then, when writing on a scanning line currently selected is completed, an erasure signal for erasing the whole picture area (panel) at time t102 to reset the whole pixels on the panel into a dark state. Then, at time t103, system data is generated and displayed and stored in the system data display region on the panel 210.

At time t104, the switches SW1 and SW2 are turned off to terminate the drive of the display panel 210. At this time, the entire image display region is erased in a dark state so as to prevent the switching or switching failure of the liquid crystal. On the other hand, the system data display region retains the system data due to the memory characteristic of the panel 210.

Referring further to FIG. 17, the SW3 is turned on and off as shown at 103; the backlight switch 221 is turned on and off as shown at 104; and the backlight 212 is turned on and off as shown at 105 in response to the actions of the switches SW3 and 221. These switches are turned off at an arbitrary time from time t101 to time t105 to turn off the backlight 212.

If the writing of the system data is desired to be confirmed, the backlight 212 may be turned off several seconds after time t104.

The hard disk is turned on and off as shown at 106, and the supply state of the main power supply is shown at 107. In the embodiment shown in FIG. 17, the operation after t105 is in a power save mode in which the drive of the panel and hard disk is terminated.

If an operator wishes to confirm the system data stored in the panel 210, the operator can turn on the switch 221 to energize the backlight 212 for a period of from time t106 to time t107.

In this way, even if the main power supply is on, the storage and regeneration of system data can be easily performed, so that the system is suited for a power save mode.

While the drive of the display panel is stopped, the scanning electrodes and data electrodes of the panel may be held at a prescribed reference potential so as to prevent the destruction of the data stored due to the memory characteristic by external electrostatic noise.

As described above, in the display apparatus according to the present invention, the first display means is constituted by a liquid crystal having a memory characteristic, so that data storage becomes possible. Accordingly, at the time of re-startup, the operator can watch data before power supply interruption, so as to facilitate the operation thereafter. Further, such data storage can be effected by utilization of the memory characteristic and without using special means (non-volatile memory or temporary power supply), so that the apparatus cost increase can be avoided, and application to a personal appliance becomes easy.

Further, the display apparatus according to the present invention is equipped with the first display means and second display means in combination so that the display content held by the first display means and the system data held by the second display means can be recognized simultaneously. As a result, at the time of re-startup, the operator can take a smooth action by observing the data before a power supply interruption stored owing to the memory characteristic and can also recognize the startup state of the apparatus owing to the second display means.

On the other hand, in the case of forming plural system data display regions driven under different conditions on occurrence of an error relating to temperature detection, an error message can be displayed in any one of the system display regions even if the temperature of the system data display regions is unclear. Accordingly, the operator can acquire necessary data concerning the cause of an error, etc. and can take an appropriate action based on the data.

What is claimed is:

1. A display apparatus, comprising:
   display means for providing a display based on image data including a display region having a memory characteristic, and drive means for driving the display means so as to:

(a) generate system data in response to an event comprising at least one of switching-off of a power supply, occurrence of an error and transition to a low sower consumption mode, (b) store system data in the display region by utilizing the memory characteristic of the display region, (c) keep the storage of the system data even in case of interruption of the power supply to the display means, and (d) drive the display means to provide a display based on the image data supplied from a host system independent of means for generating the system data.

2. A display apparatus according to claim 1, wherein said drive means includes means for generating the system data.

3. A display apparatus, comprising:

display means including a first display region for providing a display based on image data and a second display region for displaying system data having a memory characteristic; and drive means for driving the display means so as to:

(a) generate system data in response to an event comprising at least one of switching-off of a power supply, occurrence of an error and transition to a low power consumption mode, (b) store system data in the second display region by utilizing the memory characteristic of the second display region, (c) keen the storage of the system data even in case of interruption of the power supply to the display means, and (d) drive the display means to provide a display based on the image data supplied from a host system independent of means for generating the system data.

4. A display apparatus according to claim 3, wherein said first display region and second display region are defined in a common display panel.

5. A display apparatus according to claim 3, wherein said first display region and second display region are defined in a common display panel and have mutually different display areas.

6. A display apparatus according to claim 3, wherein said first display region and second display region are defined in a common ferroelectric liquid crystal display panel.

7. A display apparatus according to claim 3, wherein said first display region and second display region comprise separate panels having mutually different display areas.

8. A display apparatus according to claim 3, wherein said first display region and second display region comprise separate panels including a ferroelectric liquid crystal display panel, and the second display region is defined in the ferroelectric liquid crystal display panel.

9. A display apparatus according to claim 3, wherein said second display region is driven under a condition which varies for each scanning period.

10. A display apparatus according to claim 3, wherein said second display region is divided into plural sub-regions driven under mutually different conditions.

11. A display apparatus according to claim 3, further including an illumination light source which is turned off before or after storing the system data.

12. A display apparatus according to claim 3, wherein after turning off a power supply switch, image data on display is erased and the system data is stored.

13. A display apparatus according to claim 3, wherein said display means is driven by a host system and the system data is sent to the host system.

14. A display apparatus according to claim 3, wherein said display means is driven by a host system and a power supply state data is sent to the host system.

15. A display apparatus according to claim 3, wherein said display means is driven by a host system and, after sending power supply state data or the system data to the host system, the display means is driven according to a power economy display mode.

16. A display apparatus according to claim 3, wherein a power supply to the display means is terminated after storing the system data.

17. A display apparatus, comprising:

display means having a first display region for providing a display based on image data; and means for defining a second display region having a memory characteristic in an arbitrary region in the first display region; and driving means for driving the display means so as to:

(a) generate system data in response to an event comprising at least one of switching-off of a power supply, occurrence of an error and transition to a low power consumption mode, (b) store system data in the second display region by utilizing the memory characteristic of the second display region, (c) keep the storage of the system data even in case of interruption of the power supply to the display means, and (d) drive the display means to provide a display based on the image data supplied from a host system independent of means for generating the system data.

18. A display apparatus according to claim 17, wherein said first display region and second display region are defined in a common display panel.

19. A display apparatus according to claim 17, wherein said first display region and second display region are defined in a common display panel and have mutually different display areas.

20. A display apparatus according to claim 17, wherein said first display region and second display region are defined in a common ferroelectric liquid crystal display panel.

21. A display apparatus according to claim 17, wherein said second display region is driven under a condition which varies for each scanning period.

22. A display apparatus according to claim 17, wherein said second display region is divided into plural sub-regions driven under mutually different conditions.

23. A display apparatus according to claim 17, further including an illumination light source which is turned off before or after storing the system data.

24. A display apparatus according to claim 17, wherein after turning off a power supply switch, image data on display is erased and the system data is stored.

25. A display apparatus according to claim 17, wherein said display means is driven by a host system and the system data is sent to the host system.

26. A display apparatus according to claim 17, wherein said display means is driven by a host system and a power supply state data is sent to the host system.

27. A display apparatus according to claim 17, wherein said display means is driven by a host system and, after sending power supply state data or the system data to the host system, the display means is driven according to a power economy display mode.

28. A display apparatus according to claim 17, wherein a power supply to the display means is terminated after storing the system data.

29. A display apparatus, comprising:

a first display means comprising a liquid crystal having a memory characteristic, a host system for supplying image data to the first means to effect a display, a second display means comprising a liquid crystal for displaying system data, system data generating means independent of the host system for generating the system data, and means for, after storing the system data in the second display means, interrupting a power supply to the second display means while keeping the stored system data.

30. A display apparatus according to claim 29, including at least two liquid crystal panels comprising a liquid crystal having a memory characteristic, including one liquid crystal panel functioning as the first display means for normal display and another liquid crystal panel functioning as the second display means for displaying system data.

31. A display apparatus according to claim 29, including at least one liquid crystal panel comprising a liquid crystal having a memory characteristic, said liquid crystal panel having a prescribed region functioning as the first display means for a normal display and another region functioning as the second display means for displaying system data.

32. A display apparatus according to claim 31, wherein said prescribed region and said another region are set to have a variable areal size ratio therebetween.

33. A display apparatus according to claim 32, adapted to effect a normal display on the entirety of the liquid crystal panel when no system data is displayed, and to effect a normal display in the prescribed region and display system data in said another region when such system data is displayed.

34. A display apparatus according to claim 29, adapted to form plural system display regions when an error has occurred regarding temperature detection, wherein the plural display regions are driven under different drive conditions so as to display an error message in any one of the plural display regions.

35. A display apparatus according to claim 34, wherein the drive conditions comprise driven voltage applied to a liquid crystal panel.

36. A display apparatus according to claim 34, wherein the drive conditions comprise one scanning line drive time.

37. A display apparatus according to claim 29, further including a power supply circuit for generating a power supply interruption signal at the time of power supply interruption and supplying a drive voltage to at least said second display means for a prescribed period after generating the power supply interruption signal, and a control means for receiving the power supply interruption signal to have said second display means display data concerning the power supply interruption.

38. A display apparatus according to claim 37, including a bilateral communication path between the host system and the control means so that the control means informs the host system of the power supply interruption state through the communication path at the time of power supply interruption.

39. A display apparatus according to claim 37, including a bilateral communication path between the host system and the control means so that the control means informs the host system of error content through the communication path at the time of occurrence of an error.

40. A display apparatus comprising:

a display device including a first display region for effecting an image display based on image data supplied from a host system, and a second display region having a memory characteristic for storing system data by utilizing the memory characteristic, a controller for storing the system data in the second display region in response to switching-off of a power supply; and a switch for, after storage of the system data in the second display region, turning off a supply of drive power to the display device.

41. A display apparatus according to claim 40, wherein the controller clears the displayed image in the first display region in response to the switching-off of the power supply.

42. A display apparatus according to claim 40, including a backlight which is turned on in response to switching-on of the once switched-off power supply to allow a display of the stored system data in the second display region.

43. A display apparatus according to claim 41, including a backlight which is turned on in response to switching-on of the once switched-off power supply to allow a display of the stored system data in the second display region.

* * * * *

UNITED STATES PATENT AND TRADEMARK OFFICE
CERTIFICATE OF CORRECTION

PATENT NO. : 5,774,105

DATED : June 30, 1998

INVENTOR(S) : Yamamoto et al.

It is certified that error appears in the above-identified patent and that said Letters Patent is hereby corrected as shown below:

COLUMN 10:

Line 48, "do as" should read --so as--.

COLUMN 13:

Line 28, "keen" should read --keep--.

Signed and Sealed this

Twenty-seventh Day of April, 1999

Attest:

Q. TODD DICKINSON

*Attesting Officer*     *Acting Commissioner of Patents and Trademarks*